(12) United States Patent
Sugie

(10) Patent No.: US 9,327,656 B2
(45) Date of Patent: May 3, 2016

(54) VEHICLE INTERIOR MATERIAL

(71) Applicant: HAYASHI TELEMPU Co., Ltd., Nagoya-shi, Aichi (JP)

(72) Inventor: Takeshi Sugie, Aichi (JP)

(73) Assignee: HAYASHI TELEMPU Co., Ltd., Nagoya-shi, Aichi (JP)

( * ) Notice: Subject to any disclaimer, the term of this patent is extended or adjusted under 35 U.S.C. 154(b) by 0 days.

(21) Appl. No.: 14/559,925

(22) Filed: Dec. 4, 2014

(65) Prior Publication Data

US 2015/0191140 A1 Jul. 9, 2015

(30) Foreign Application Priority Data

Jan. 9, 2014 (JP) ................................. 2014-002062

(51) Int. Cl.
*B60R 13/02* (2006.01)
*B60R 21/04* (2006.01)

(52) U.S. Cl.
CPC ............. B60R 13/025 (2013.01); B60R 21/04 (2013.01); *B60R 2013/0287* (2013.01); *B60R 2021/0414* (2013.01); *B60R 2021/0435* (2013.01); *B60R 2021/0442* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,992,914 A * | 11/1999 | Gotoh | ................. | B60R 13/0206 280/751 |
| 6,049,952 A * | 4/2000 | Mihelich | ............. | B60R 13/0206 24/289 |
| 7,240,919 B2 * | 7/2007 | Tajima | .................. | B60R 21/045 280/751 |
| 7,690,676 B2 * | 4/2010 | Jaramillo | ............... | B60R 13/025 280/728.2 |
| 7,717,458 B2 * | 5/2010 | Tsuge | ..................... | B60R 13/02 24/458 |
| 7,722,113 B2 * | 5/2010 | Kamiya | ................ | B60R 13/025 296/1.08 |
| 7,766,377 B2 * | 8/2010 | Downey | ................ | B60R 21/232 280/728.2 |
| 7,784,818 B2 * | 8/2010 | Downey | ................ | B60R 21/232 280/728.3 |
| 8,011,709 B2 * | 9/2011 | Senakiewich, II | .... | B60R 13/025 24/289 |
| 8,029,041 B2 * | 10/2011 | Hall | ....................... | B60J 5/0451 296/146.6 |
| 8,297,676 B2 * | 10/2012 | Osterhout | ........... | B60R 13/0206 280/728.2 |
| 8,303,010 B2 * | 11/2012 | She | ...................... | B60R 13/0206 296/1.08 |
| 8,646,831 B2 * | 2/2014 | Ohba | ...................... | B60R 13/04 296/193.08 |
| 8,746,733 B2 * | 6/2014 | Hayashi | ................ | B60R 21/055 280/730.2 |
| 8,919,867 B2 * | 12/2014 | Davis | ..................... | B62D 65/14 296/193.06 |
| 2004/0113401 A1 * | 6/2004 | Ryu | ....................... | B60R 21/213 280/730.2 |

FOREIGN PATENT DOCUMENTS

JP 2008-296762 A 12/2008

* cited by examiner

*Primary Examiner* — Nicole Verley
(74) *Attorney, Agent, or Firm* — Yokoi & Co., U.S.A.; Toshiyuki Yokoi

(57) ABSTRACT

The present invention discloses a vehicle interior material that is integrally formed, the vehicle interior material comprising an impact absorbing rib that is extended from a counter surface facing a vehicle body panel, an insertion portion that is inserted into a hole formed on the vehicle body panel; and a base portion that has a thick portion that is thicker than the impact absorbing rib, is extended from the counter surface, and is integrated with the insertion portion at a tip portion of the base portion.

11 Claims, 14 Drawing Sheets

VEHICLE INTERIOR MATERIAL

CROSS-REFERENCES TO RELATED APPLICATIONS

This patent specification is based on Japanese patent application, No. 2014-002062 filed on Jan. 9, 2014 in the Japan Patent Office, the entire contents of which are incorporated by reference herein.

BACKGROUND OF THE INVENTION

1. Field of the Invention

The present invention relates to a vehicle interior material with which an impact absorbing rib extending from a counter surface facing a vehicle body panel is integrally formed.

2. Description of Related Art

On an automobile, metal vehicle body panels such as a pillar panel, a roof panel and a door panel are provided, for example. On a cabin side of the vehicle body panel, various interior materials such as a pillar trim (pillar garnish), a roof trim and a door trim are placed. An impact absorbing rib can be integrally formed with the interior materials so as to absorb impact energy applied to an occupant and protect the occupant when impact occurs because of car accident or other reasons. The impact absorbing rib is provided on a surface of the interior materials facing the vehicle body panel.

Japanese Unexamined Patent Application Publication No. 2008-296762 discloses a pillar garnish with which an impact absorbing body is integrated on a reverse surface facing a front pillar. The front pillar is a pillar panel placed between a windshield and a front door glass of a vehicle. The front pillar is also referred to as an A pillar panel. The pillar garnish assembled to the A pillar panel is also referred to as an A pillar garnish.

When the impact occurs, an impact force may be applied forward from the head of the occupant to the A pillar garnish having an insertion portion that is inserted into a hole formed on a vehicle body panel. In such a case, a force is applied to the insertion portion in a direction crossing a projecting direction of the insertion portion. The force may be also applied to other vehicle interior materials than the A pillar garnish.

BRIEF SUMMARY OF THE INVENTION

The present invention discloses a vehicle interior material capable of improving impact absorbing performance when the impact force is applied to the direction crossing an inserting direction of the insertion portion.

One aspect of the present invention provides a vehicle interior material that is integrally formed, the vehicle interior material comprising; an impact absorbing rib that is extended from a counter surface facing a vehicle body panel; an insertion portion that is inserted into a hole formed on the vehicle body panel; and a base portion that has a thick portion that is thicker than the impact absorbing rib, is extended from the counter surface, and is integrated with the insertion portion at a tip portion of the base portion. Here, "integrally formed" means that the vehicle interior material is integrally formed with the impact absorbing rib, the insertion portion, the base portion, and other interior materials.

These and other features, aspects, and advantages of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments.

DETAILED DESCRIPTION OF THE INVENTION

Figure 1:
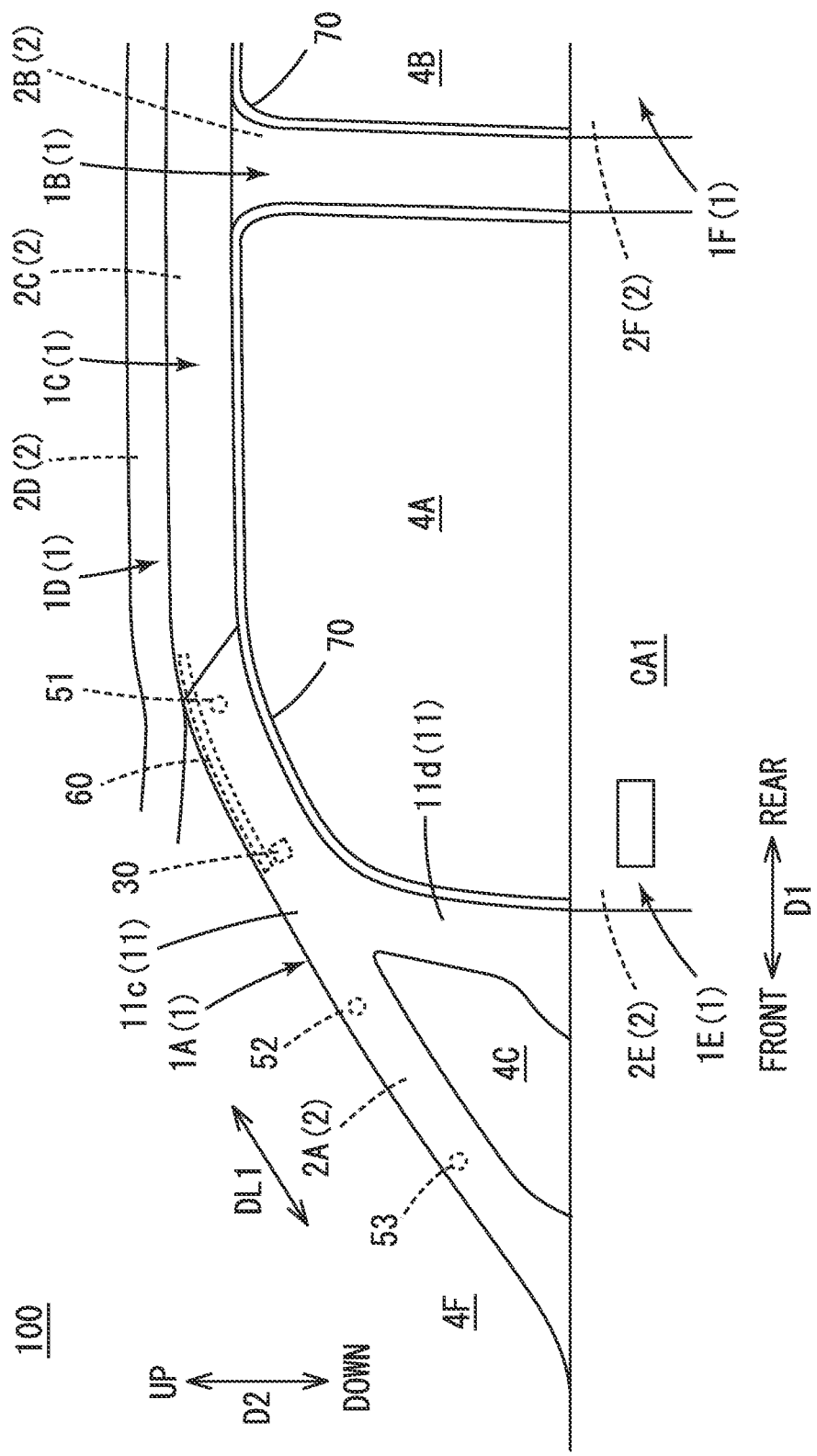
FIG. 1 is a diagram schematically showing an example of an interior of an automobile 100.

Hereafter, an embodiment of the present invention will be explained. Of course, the below-described embodiment merely exemplifies the present invention. All the features shown in the embodiment are not necessarily required to solve the problem.

(1) Outline of the Present Technology:

At first, with reference to FIGS. 1 to 14, an outline of the present technology will be explained.

An integrally formed vehicle interior material 1 has an impact absorbing rib 20 extended from the counter surface 11b which is facing the vehicle body panel 2 and an insertion portion 40 to be inserted into a hole 3 formed on the vehicle body panel 2. The vehicle interior material 1 has a thick portion 36 and a base portion 30. The thick portion 36 is thicker than the impact absorbing rib 20. The base portion 30 is extended from the counter surface 11b. The insertion portion 40 is integrated with a tip portion of the base portion 30.

Figure 14:
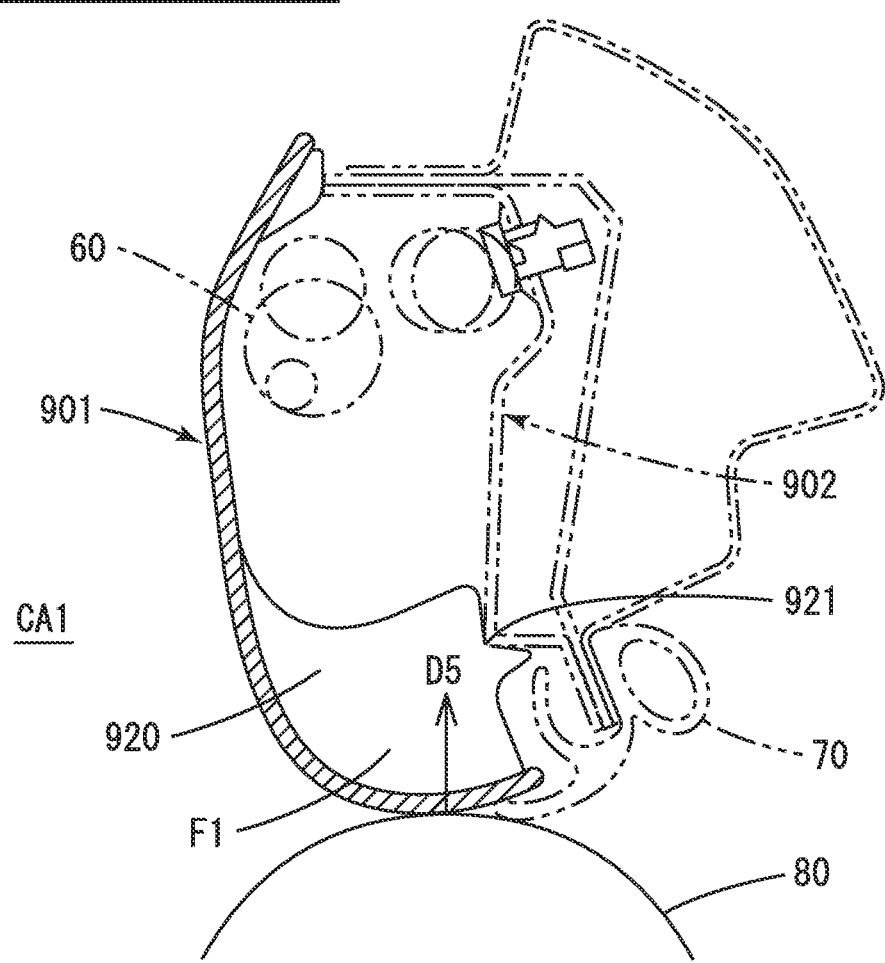
FIG. 14 is a cross-sectional view schematically showing a state that the FMH 80 is moved forward and in contact with a pillar garnish 901 in a comparative example.

FIG. 14 shows a pillar garnish 901 mounted on an A pillar panel 902 which is located between the windshield and the front door glass of the vehicle as a comparative example. An impact absorbing rib 920 is extended from a reverse surface of the pillar garnish 901 toward the A pillar panel 902. At an edge of the impact absorbing rib 920, a locking portion 921 is formed so as to be in contact with the A pillar panel 902. FIG. 14 also schematically shows a state that an FMH (Free Motion Head Form) 80 is moved forward and in contact with the pillar garnish 901 when an impact test is performed for a sample of the comparative example. The FMH 80 is corresponding to the head of the occupant. Since the impact absorbing rib 920 is provided, even when the head of the occupant moved forward is in contact with the pillar garnish 901 from a rear side of the pillar garnish 901, the impact absorbing rib 920 is crushed between the head of the occupant and the A pillar panel 902 to absorb the impact. In this kind of interior material, movement of the impact absorbing rib should be restricted in order to receive impact load when the occupant is in contact with the interior material. For example, the movement can be restricted if the impact absorbing rib is hooked by the vehicle body panel.

However, in some cases, a hooking margin of the impact absorbing rib formed on an A pillar garnish cannot be ensured for a reason of appearance design of the vehicle (e.g. thin A pillar panel) or other reasons. In such a case, when the head of the occupant is in contact with the A pillar garnish, the A pillar garnish is moved forward while sliding on the A pillar panel. Therefore, the load is not sufficiently applied to the impact absorbing rib, and a desired impact absorbing performance cannot be realized.

An impact absorbing body described in Japanese Unexamined Patent Application Publication No. 2008-296762 has a thin plate-shaped first rib directed toward a longitudinal direction of a pillar garnish and a plurality of thin plate-shaped second ribs crossing the first rib. When the occupant is in contact with the pillar garnish, the impact absorbing body hit against the front pillar is deformed to absorb the impact. In some cases, the impact absorbing body is broken to absorb the impact. At crossing parts of the first rib and the second ribs, an insertion portion is formed so as to be inserted into a hole portion opened on the front pillar. At the insertion portion, a thin plate-shaped third rib extended from the first rib toward the front pillar side and a thin plate-shaped fourth rib extended from the second ribs toward the front pillar side are crossed with each other in a cross shape.

When the impact occurs, an impact force may be applied forward from the head of the occupant to the A pillar garnish. In such a case, the force is applied to the insertion portion in a direction crossing a projecting direction of the insertion portion. If an angle formed by the direction of the force and the projecting direction of the insertion portion is large, the insertion portion, which is formed by crossing the thin plate-shaped third rib and the thin plate-shaped fourth rib, may be deformed and dropped out from the hole portion of the front pillar. However, in some cases, clips to mount the A pillar garnish on the hole portion cannot be used due to product design. Even when the angle formed by the direction of the impact force and the projection direction of the insertion portion is large, if the insertion portion is prevented from being dropped out from the hole portion of the front pillar without using the clips, the impact absorbing performance against the impact force can be improved.

On the other hand, in an integrally formed vehicle interior material 1 of the present technology, the thick portion 36 is formed on the base portion 30, which is extended from the counter surface 11b facing the vehicle body panel 2. In addition, the insertion portion 40 to be inserted into the hole 3 of the vehicle body panel 2 is integrated with a tip portion (head portion 34) of the base portion 30. Therefore, rigidity of the base portion 30 is increased. Consequently, even if an impact force F1 is applied in a direction D5, which is crossing an insertion direction D4 for inserting the insertion portion 40 into the hole 3 of the vehicle body panel 2, the insertion portion 40 is prevented from being disconnected from the hole 3 of the vehicle body panel 2. Thus, the above embodiment can provide a vehicle interior material 1 capable of improving the impact absorbing performance without using the clips when the impact force F1 is applied in the direction D5, which is crossing the insertion direction D4 of the insertion portion 40.

The base portion 30 can have the head portion 34 which is integrated with the insertion portion 40, and first and second wall portions 31, 32 which face each other across a space SP1 and lead from the counter surface 11b to the head portion 34. The thick portion 36 can be provided astride the head portion 34 and at least one of the first and second wall portions 31, 32. The thick portion 36 is provided astride the head portion 34 and at least one of the first and second wall portions 31, 32, which are extended from the counter surface 11b facing the vehicle body panel 2. Therefore, rigidity of the base portion 30 is increased. Consequently, even if the impact force F1 is applied in the crossing direction D5, the insertion portion 40 is prevented from being disconnected from the hole 3 of the vehicle body panel 2. Thus, the present embodiment can further improve the impact absorbing performance when the impact force F1 is applied in the crossing direction D5.

A distance L1 between the first wall portion 31 at a connection part to the head portion 34 and the second wall portion 32 at a connection part to the head portion 34 can be narrower than a distance L2 between the first wall portion 31 at a connection part to the counter surface 11b and the second wall portion 32 at a connection part to the counter surface 11b. By using the above configuration, rigidity of the base portion 30 can be increased. Therefore, even if the impact force F1 is applied in the crossing direction D5, the insertion portion 40 is prevented from being disconnected from the hole 3 of the vehicle body panel 2. Thus, the present embodiment can improve the impact absorbing performance when the impact force F1 is applied in the crossing direction D5.

The head portion 34 can have a first edge portion 34a connected to the first wall portion 31, a second edge portion 34b connected to the second wall portion 32, and third and fourth edge portions 34c, 34d connected to both the first edge portion 34a and the second edge portion 34b while being separated with each other. The base portion 30 can have a third wall portion 33 which leads from the counter surface 11b to the third edge portion 34c. Since the third wall portion 33 is provided, rigidity of the base portion 30 is increased. Therefore, even if the impact force F1 is applied in the crossing direction D5, the insertion portion 40 is prevented from being disconnected from the hole 3 of the vehicle body panel 2. Thus, the present embodiment can improve the impact absorbing performance when the impact force F1 is applied in the crossing direction D5.

At least one of outer surfaces (31o and 32o) of the first wall portion 31 and the second wall portion 32 can be connected to the impact absorbing rib 20. In this embodiment, when the impact is input, the impact absorbing rib 20 is deformed by receiving a load between the base portion 30 and a contact position of the occupant. In some cases, the insertion portion 40 is deformed by receiving a load transmitted through the impact absorbing rib 20. Thus, the impact absorbing performance can be further improved when the impact force F1 is applied in the crossing direction D5.

In the head portion 34, if a surface facing the vehicle body panel 2 is referred to as a panel side surface 34p, outer surfaces 41o, 42o of the insertion portion 40 can be extended outward (outward direction D6) from a virtual axis AX1, which is along the insertion direction D4 for inserting the insertion portion 40 into the hole 3 of the vehicle body panel 2, at a connection part to the head portion 34 so that the outer surfaces 41o, 42o are aligned with the panel side surface 34p. In this embodiment, when the impact is input, the insertion portion 40 is prevented from being broken at the connection part to the head portion 34. Thus, the impact absorbing performance can be further improved when the impact force F1 is applied in the crossing direction D5.

The insertion portion 40 can be tapered. In this embodiment, when the vehicle interior material 1 is assembled on the vehicle body panel 2, the insertion portion 40 can be easily inserted into the hole 3 of the vehicle body panel 2. In addition, since the insertion portion 40 is guided to an assembling position by a tapered shape, the present embodiment can improve the assembling workability.

The insertion portion 40 can have a plurality of divided ribs 41, 42, 43 which are branched so as to be directed toward an edge portion 3e of the hole 3 of the vehicle body panel 2. In this embodiment, when the impact is input, the insertion portion 40 is easily hooked by the edge portion 3e of the hole 3 of the vehicle body panel 2. Therefore, the insertion portion 40 is further prevented from being dropped out from the hole 3 of the vehicle body panel 2. Thus, the impact absorbing performance can be improved.

When the insertion portion 40 is mounted on the vehicle body panel 2, the insertion portion 40 can be arranged separated from the edge portion 3e of the hole 3 of the vehicle body panel 2. In this embodiment, the vehicle interior material 1 can be easily assembled on the vehicle body panel 2.

(2) Concrete Examples:

FIG. 1 schematically shows an example of an interior of an automobile 100 having the vehicle interior material 1. In the figures, FRONT, REAR, UP, DOWN respectively represent the front, rear, up, and down side of the automobile. Positional relation between left and right is based on a direction of viewing the front from the rear of the automobile. A symbol D1 represents a front-rear direction, a symbol D2 represents an up-down direction, and a symbol DL1 represents a longitudinal direction of a main portion 11c of a front pillar garnish 1A. In order to help understanding, a magnification ratio of each direction may be different in FIGS. 1 to 14 and figures may not be matched with each other.

The automobile 100 shown in FIG. 1 is a road running vehicle designed and equipped for being used on a road. In addition, a cabin CA1 is formed around sheets (not illustrated) so that the automobile 100 can be used as a passenger car. A vehicle body panel 2 of the automobile 100 includes a pillar panel, a side roof rail 2C, a roof panel 2D, and a door panel, for example. The pillar panel at least includes a front pillar panel 2A located between a front window 4F on which the windshield is provided and a front door window 4A on which the front door glass is provided, a center pillar panel 2B located between the front door window 4A and a rear door window 4B, and a rear pillar panel (not illustrated) located behind the rear door window 4B. Note that the front pillar panel 2A is also referred to as an A pillar panel, the center pillar panel 2B is also referred to as a B pillar panel, and the rear pillar panel is also referred to as a C pillar panel. The pillar panels (2A, 2B) support a ceiling portion of the automobile 100 as a frame of the vehicle.

The front pillar panel 2A shown in FIG. 1 is branched into two. In addition, a fixed triangular window 4C is mounted on the front pillar panel 2A. Therefore, the front door glass is divided into an opening/closing portion provided on the front door window 4A and a fixed portion provided on the window 4C. The door panel at least includes a front door panel 2E arranged beside a front sheet and a rear door panel 2F arranged beside a rear sheet. An opening trim 70 formed of an elastic member such as a rubber is provided on the vehicle body panel 2 at a position which frames the door windows 4A, 4B.

The interior material 1 such as a pillar garnish (pillar trim), a side roof rail garnish 1C, a roof trim 1D, and a door trim is mounted on the cabin CA1 side of the vehicle body panel 2. The pillar garnish at least includes a front pillar garnish 1A mounted on the front pillar panel 2A, a center pillar garnish 1B mounted on the center pillar panel 2B, and a rear pillar garnish (not illustrated) mounted on the rear pillar panel. Note that the front pillar garnish 1A is also referred to as an A pillar garnish, the center pillar garnish 1B is also referred to as a B pillar garnish, and the rear pillar garnish is also referred to as a C pillar garnish. In accordance with the shape of the front door window 4A branched into two, the front pillar garnish 1A shown in FIG. 1 is branched into two having a body 11 in which a branch portion 11d is branched from a main portion 11c. The side roof rail garnish 1C is mounted on the side roof rail 2C. From the front pillar garnish 1A to the side roof rail garnish 1C, a curtain side airbag 60 is mounted on the cabin CA1 side of the front pillar panel 2A and the side roof rail 2C. The roof trim 1D is mounted on the roof panel 2D. The door trim at least includes a door trim 1E mounted on the front door panel 2E and a door trim 1F mounted on the rear door panel 2F. The interior material 1 has a function of improving the design by covering the cabin CA1 side of the vehicle body panel 2, and a function of protecting the occupant by reducing harm to the occupant when the impact occurs.

For the interior material 1 including the front pillar garnish 1A, a molded article, which is formed by molding a molding material, can be used, for example. The molding can be injection molding or press molding, for example. In addition, the molding can be executed after the molding material is formed so that the interior material is lighter. For the molding material, resin molding material containing synthetic resins such as a thermoplastic resin and a thermosetting resin can be used, for example. For the resin molding material, a polypropylene, an acrylonitrile-butadiene-styrene (ABS) resin, and an epoxy resin can be used, for example. In addition, modified resin formed by adding an elastomer to the above mentioned synthetic resins and material formed by adding an additive such as talc (filler) or a coloring agent to the above mentioned resins can be used. Furthermore, surface materials such as a nonwoven fabric can be laminated on a surface of the interior material, especially on the surface (11a) of the cabin CA side.

Figure 2:
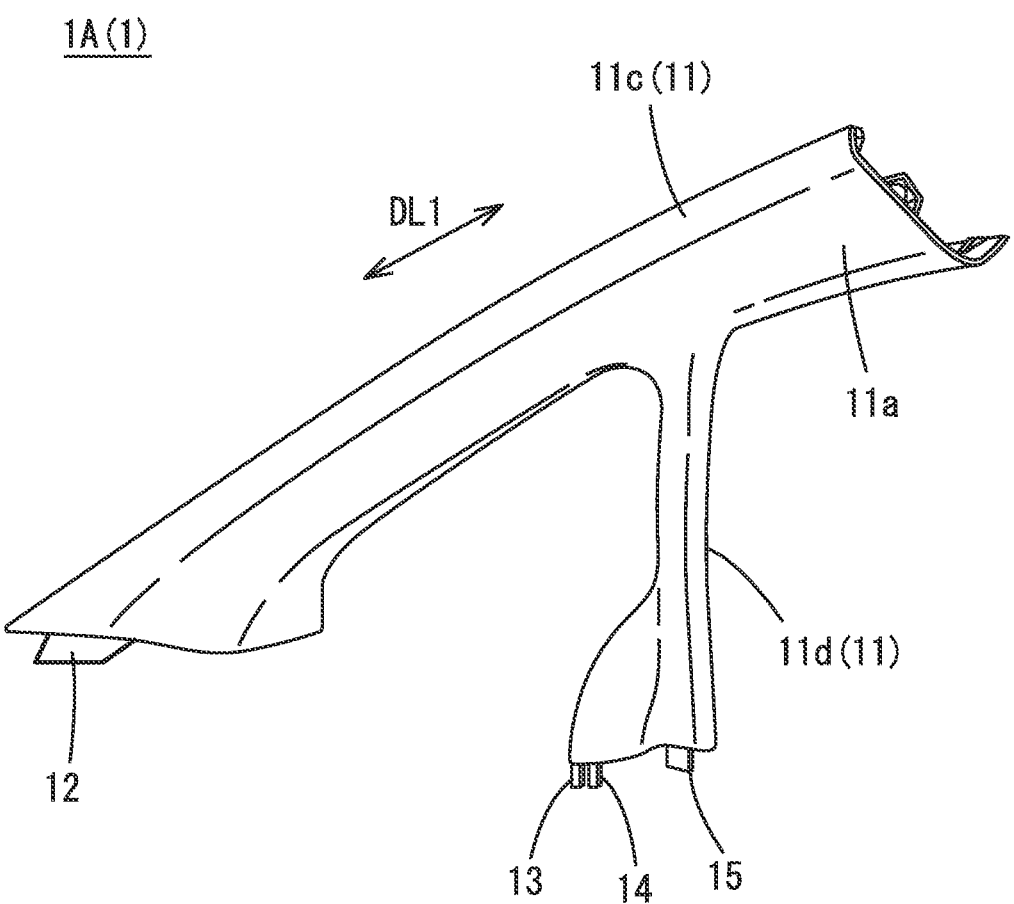
FIG. 2 is a perspective view showing an example of an interior material 1 viewed from a cabin CA1 side.
Figure 3:
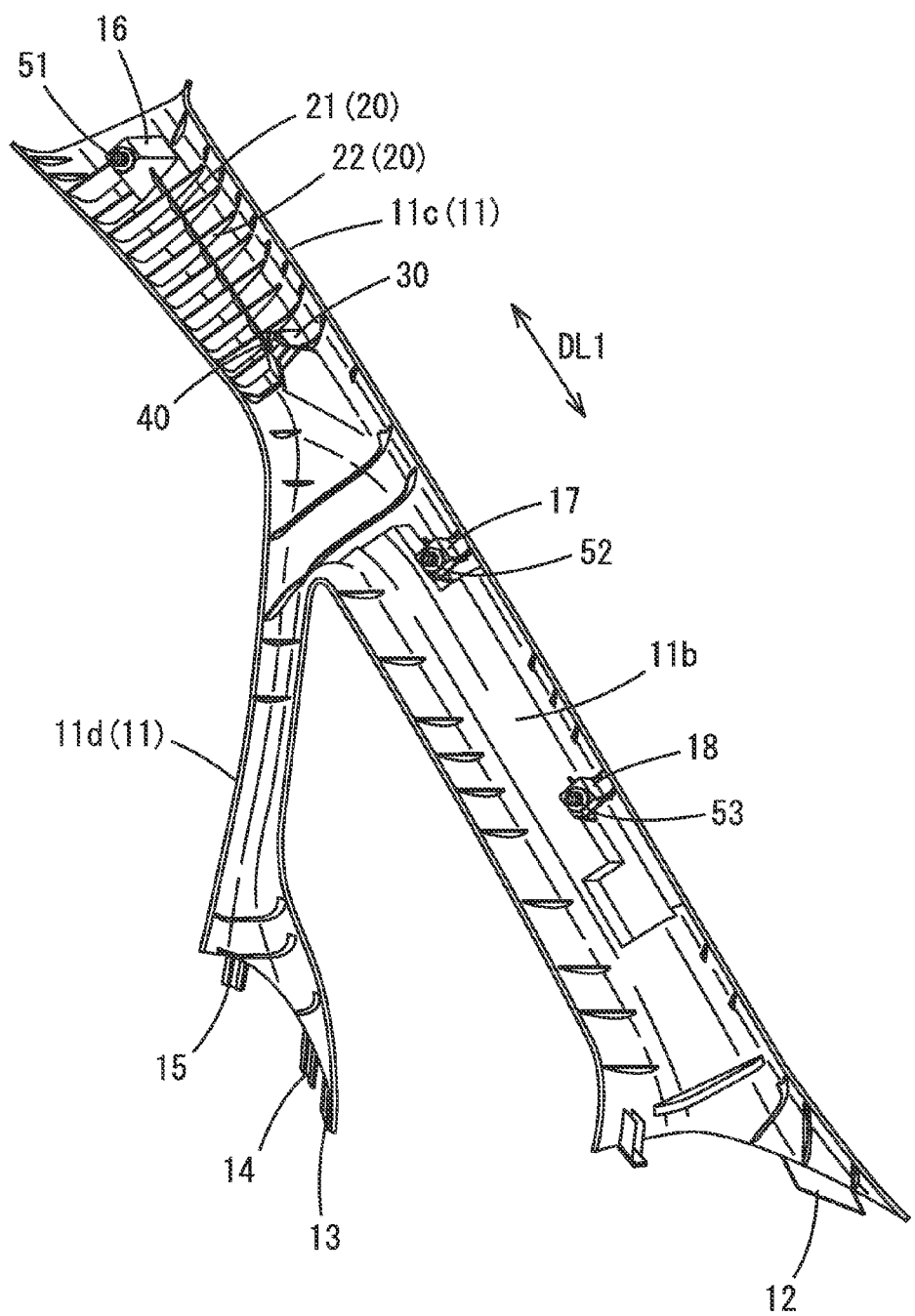
FIG. 3 is a perspective view showing an example of the interior material 1 viewed from a reverse surface side.

FIG. 2 shows an example of the cabin CA1 side of the front pillar garnish 1A. FIG. 3 shows an example of a reverse surface (counter surface 11b) side of the front pillar garnish 1A. As described above, the body 11 of the front pillar garnish 1A is branched into two, one is the main portion 11 c and the other is the branch portion 11d. Locking claws 12, 13, 14, 15 are formed at a lower end portion of the body 11 so as to be engaged with a mating member (not illustrated) such as a lower garnish (i.e. other interior materials). On the mating member such as the lower garnish, locking holes are formed so as to lock the locking claws 12 to 15. In addition, a plurality of clip seats 16, 17, 18 are formed on the counter surface 11b, which is a reverse surface of the front pillar garnish 1A. On the clip seats 16 to 18, clips 51, 52, 53, which can be separate from the clip sheets, are attached. Thorough holes (not illustrated) are formed on the pillar panel 2A so that the clips 51 to 53 are fitted into respective through holes. In an assembling line of the vehicle, a worker can position the pillar garnish 1A relative to the mating member by inserting the locking claws 12 to 15 into the through holes of the mating member and locking the locking claws 12 to 15 on the mating member. Then, the clips 51 to 53 are fitted into the through holes of the pillar panel. Thus, the pillar garnish 1A is mounted on the vehicle body and fixed on the vehicle body.

Figure 4:
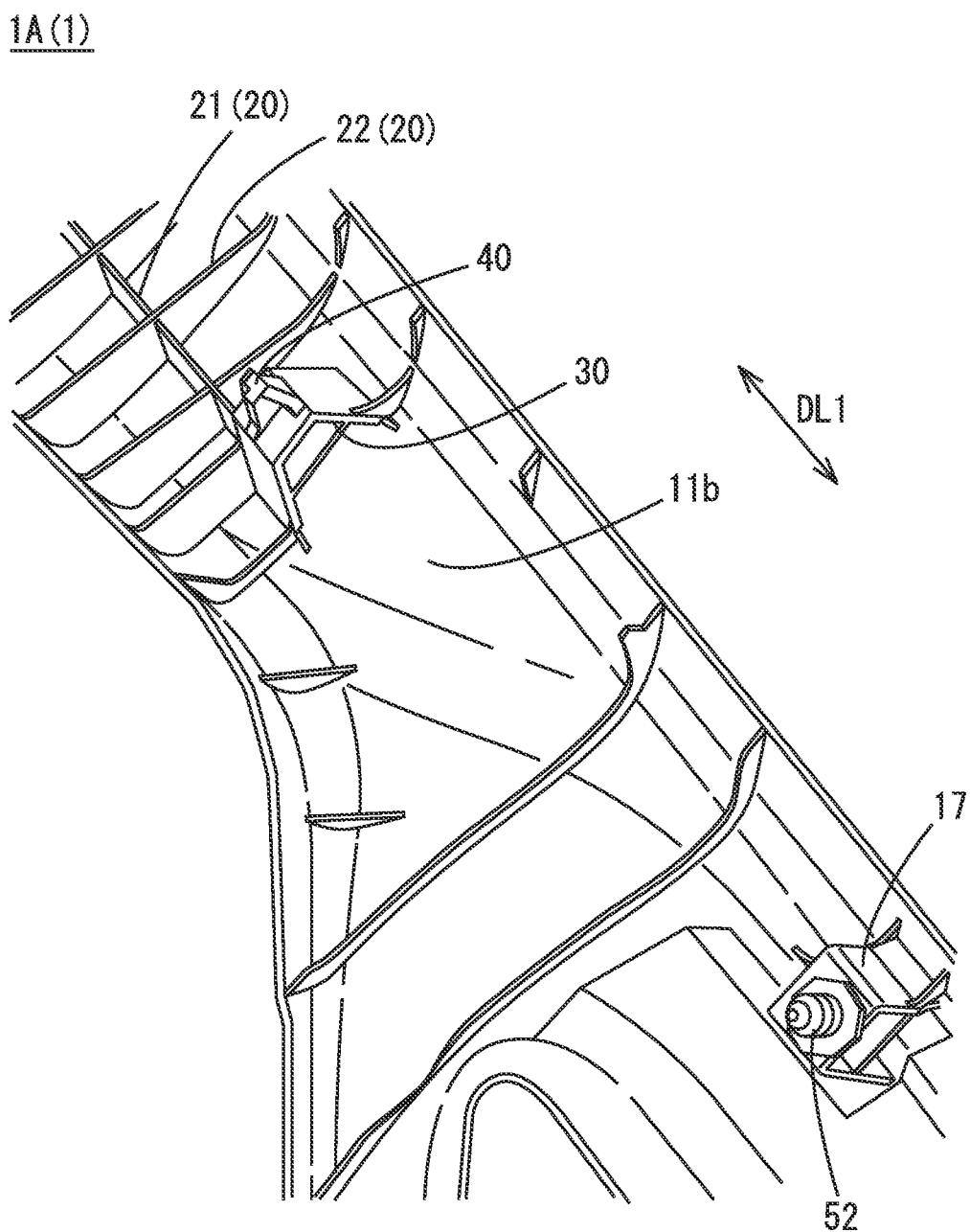
FIG. 4 is a perspective view showing an enlarged example of a main portion of the reverse surface side of the interior material 1.
Figure 5:
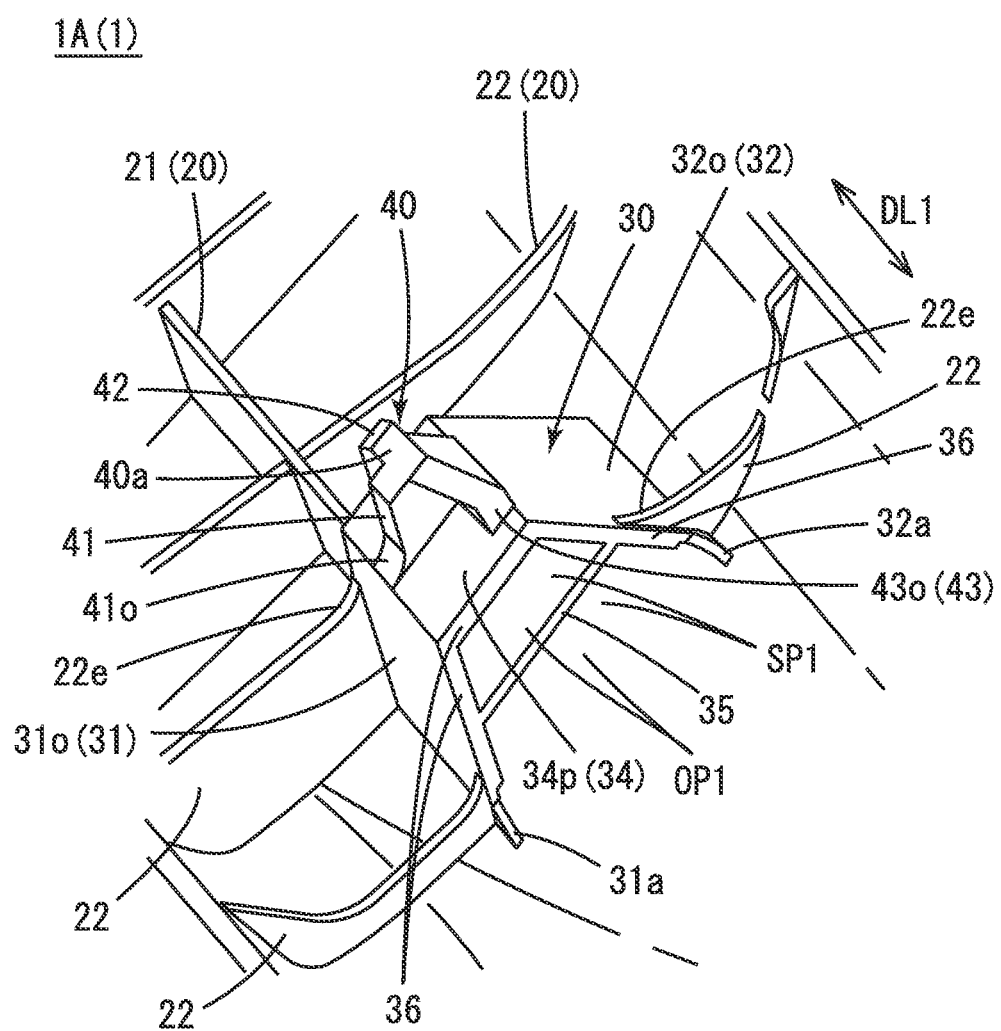
FIG. 5 is a perspective view showing an enlarged example of a base portion 30 and surrounding areas.
Figure 6:
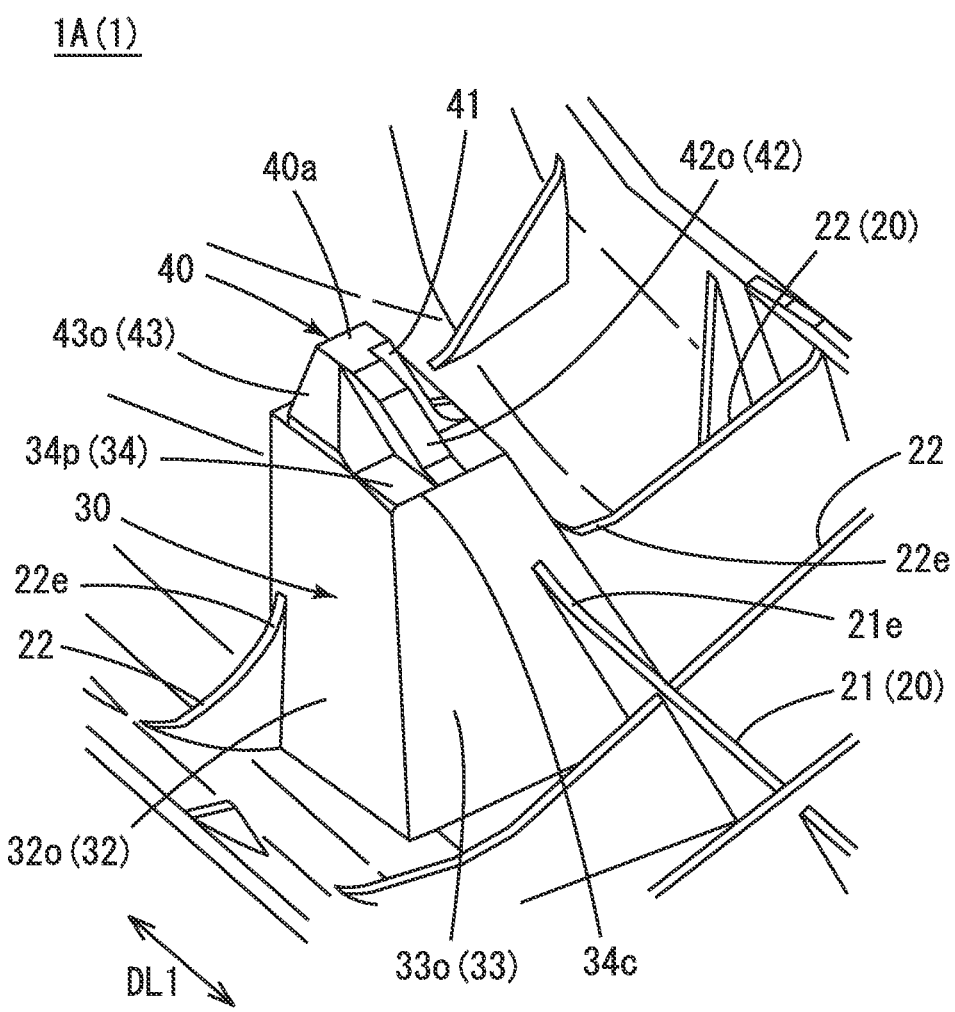
FIG. 6 is a perspective view showing an enlarged example of the base portion 30 and surrounding areas viewed from another direction different from FIG. 5.
Figure 7:
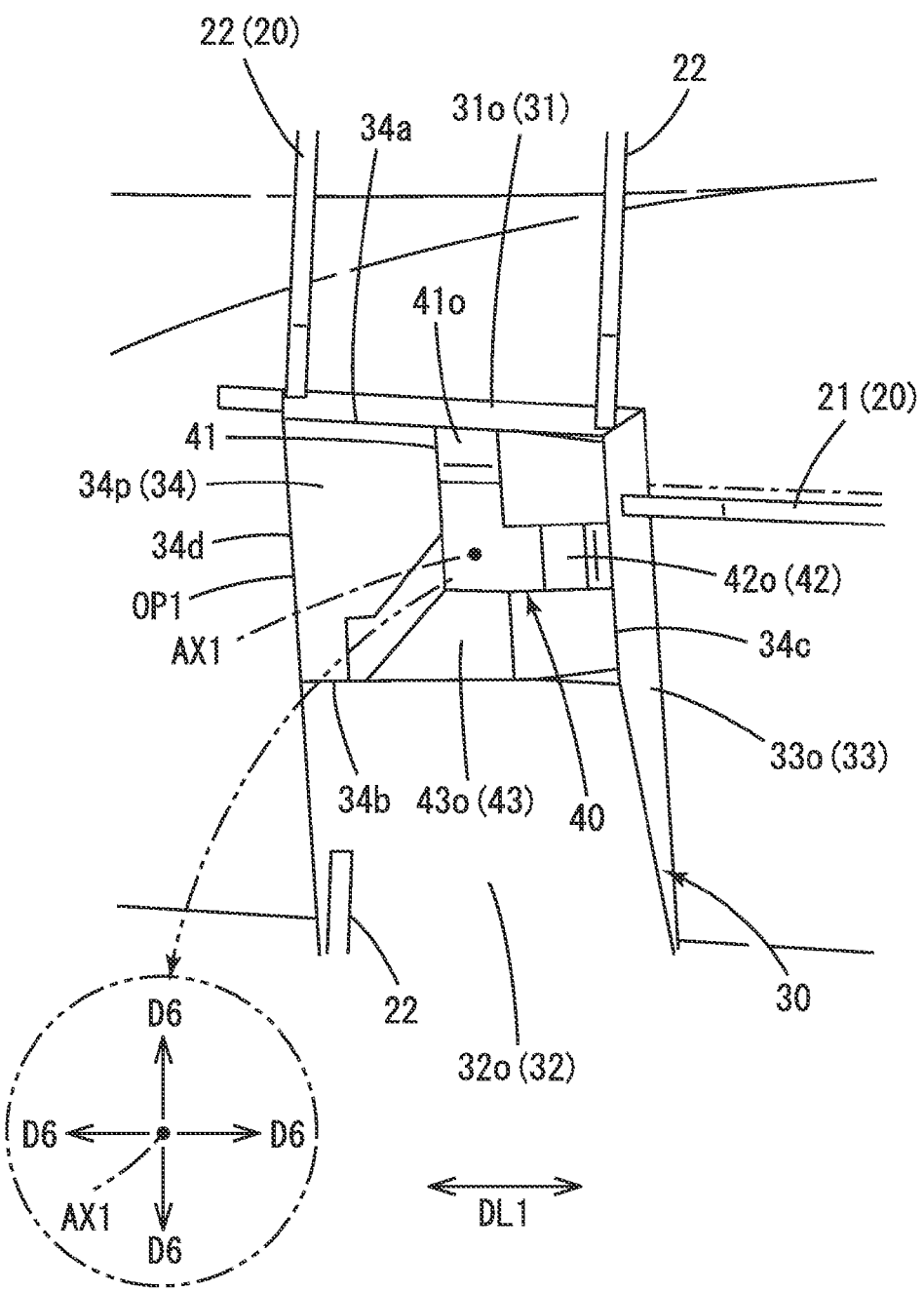
FIG. 7 is a diagram showing an enlarged example of the base portion 30 and surrounding areas viewed from a vehicle body panel 2 side.
Figure 8:
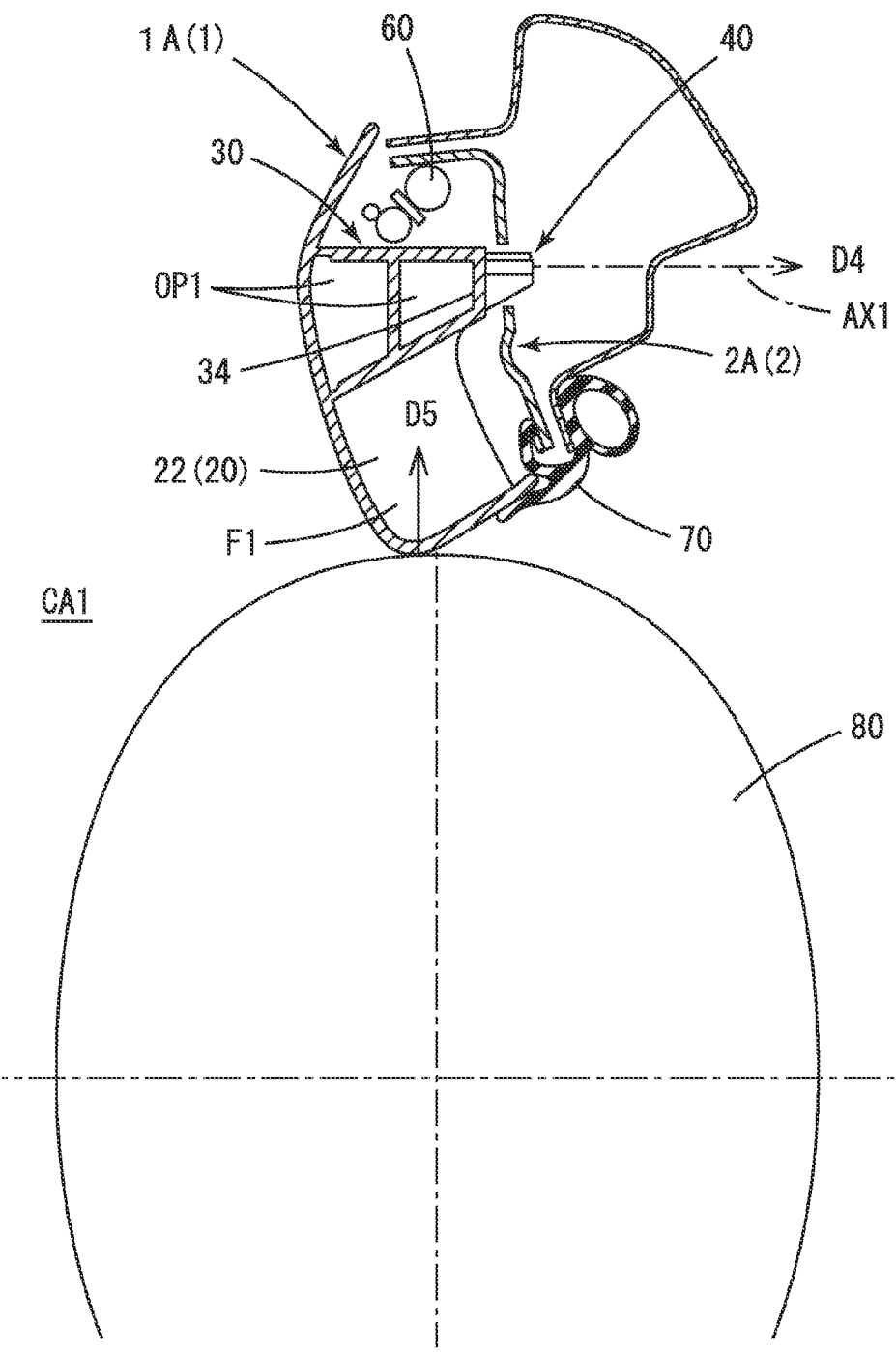
FIG. 8 is a cross-sectional view schematically showing an example of a state that an FMH (Free Motion Head Form) 80 is moved forward and in contact with the interior material 1.
Figure 9:
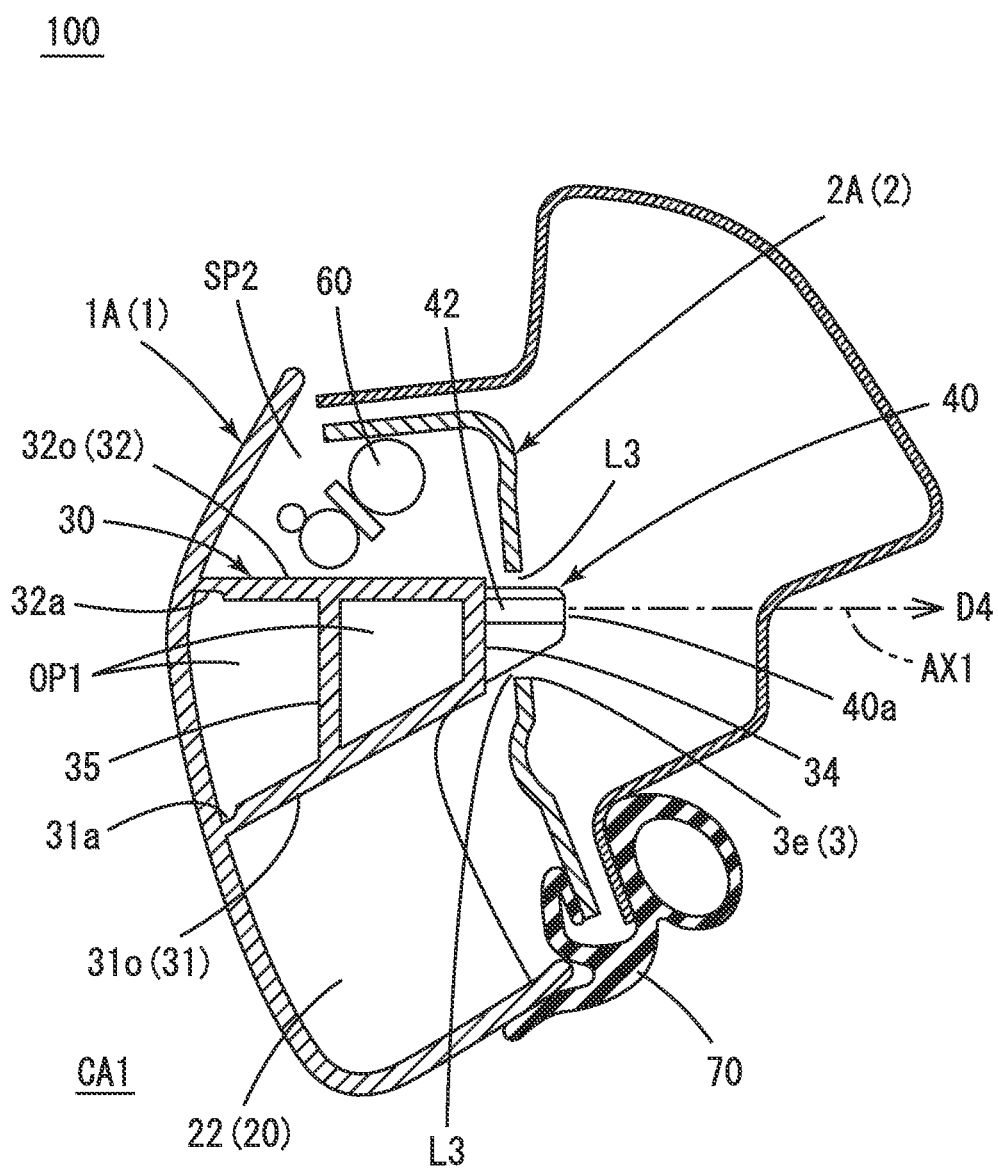
FIG. 9 is a cross-sectional view cut near a third wall portion 33 showing an example of a main portion of the automobile 100 in which the interior material 1 is assembled to the vehicle body panel 2.
Figure 10:
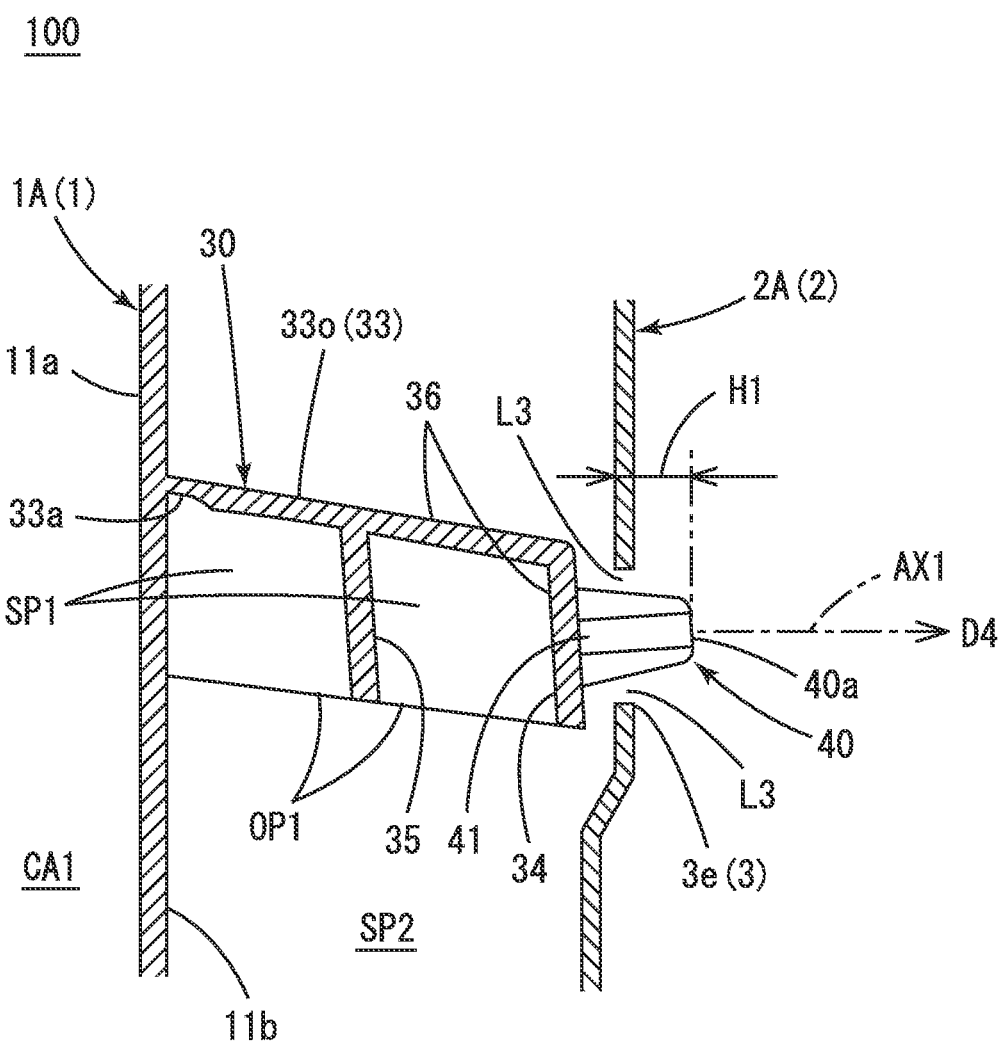
FIG. 10 is a cross-sectional view cut near a first wall portion 31 showing an example of the main portion of the automobile 100 in which the interior material 1 is assembled to the vehicle body panel 2.
Figure 11:
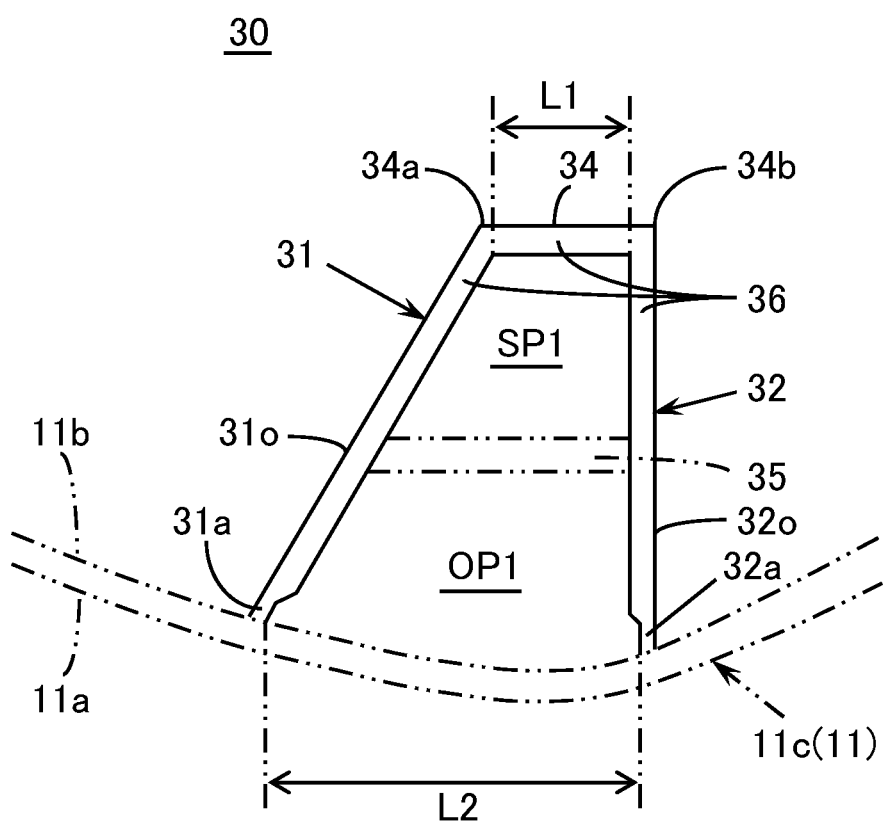
FIG. 11 is a diagram showing an example of the base portion 30 viewed from an opening OP1 side.

FIG. 4 shows an enlarged example of a main portion of the reverse surface (counter surface 11b) side of the interior material 1. FIGS. 5 to 7 show enlarged examples of the base portion 30 and surrounding areas. FIGS. 8, 9 show examples of a main portion of the automobile 100 in the cross section at a position just behind the third wall portion 33 viewed from the third wall portion 33 side of the base portion 30. FIG. 10 shows an example of the main portion of the automobile 100 in the cross section at a position just behind the first wall portion 31 viewed from the first wall portion 31 side of the base portion 30. FIG. 11 shows an example of the base portion 30 viewed from an opening OP1 side by omitting the insertion portion 40 and seeing through the main portion 11c and a reinforcing rib 35. The insertion portion 40 is integrated with the head portion 34 of the base portion 30 and inserted into a square-shaped hole 3, which is a through hole formed on the pillar panel 2A. Note that since the clips are not used at the hole 3, cost of the clips can be cut down and man-hours for assembling the clips can be cut down.

On an upper portion of the main portion 11c, the impact absorbing rib 20 for protecting the head from impact is extended toward the pillar panel 2A from the counter surface (11b) facing the pillar panel 2A. The impact absorbing rib 20 has a thin plate-shaped vertical rib 21 directed toward a longitudinal direction DL1 of the main portion 11c and a plurality of thin plate-shaped horizontal ribs 22 crossing the vertical rib 21. Therefore, the impact absorbing rib 20 is integrated with the body 11 so that the ribs 21, 22 are arranged in a lattice shape. When the impact load is applied, the impact absorbing rib 20 is deformed to absorb the impact. In some cases, the impact absorbing rib 20 is broken from the base to absorb the impact. A thickness of the ribs 21, 22 is specified to be approximately 0.5 to 1 mm so that the ribs 21, 22 are deformed to absorb the impact when the impact is input. Although the impact absorbing performance is more improved as a height of the ribs 21, 22 from the counter surface 11b is higher, the height of the ribs 21, 22 is specified while considering a balance with other components (e.g. curtain side airbag 60) arranged on a space SP2 formed between the pillar garnish 1A and the pillar panel 2A.

As shown in FIG. 3, between the clip seat 16 and the clip seat 17, the base portion 30 having a tower shape is protruded from the counter surface 11b of the pillar garnish 1A toward the pillar panel 2A. The base portion 30 having a tower shape can be also referred to as a tower portion.

As shown in FIGS. 5 to 7 and 11, the base portion 30 has a plate-shaped head portion 34, plate-shaped first and second wall portions 31, 32, and a plate shaped third wall portion 33. A space SP1 is formed between the head portion 34 and the counter surface 11b. The insertion portion 40 is integrated with the head portion 34. The first and second wall portions 31, 32 face each other across the space SP1 and lead from the counter surface 11b to the head portion 34. The third wall portion 33 leads from the counter surface 11b to the head portion 34 at an opposite side of the opening OP1. The head portion 34 is a bridge portion connecting tips of the wall portions 31, 32, 33. The insertion portion 40, which is a protrusion inserted into the hole 3, is integrally formed on the panel side surface 34p of the pillar panel 2A side of the head portion 34. As shown in FIG. 7 and other figures, the head portion 34 has a first edge portion 34a connected to the first wall portion 31, a second edge portion 34b connected to the second wall portion 32, and third and fourth edge portions 34c, 34d connected to both the first edge portion 34a and the second edge portion 34b while being separated with each other. The third wall portion 33 leads from the counter surface 11b to the third edge portion 34c. Both edge portions of the third wall portion 33 in a width direction, which is crossing the insertion direction D4 for inserting the insertion portion 40 into the hole 3 of the pillar panel 2A, are respectively connected to the first wall portion 31 and the second wall portion 32. Therefore, rigidity of the base portion 30 is high. For convenience of the molding (e.g. injection molding), the opening OP1 connected to an internal space SP1 is formed from the fourth edge portion 34d to the counter surface 11b.

The thick portion 36, which is specified to be thicker than the ribs 21, 22 (impact absorbing rib 20), are formed on the wall portions 31, 32, 33 and the head portion 34. Totally considering viewpoints such as strength, impact absorbing performance, and weight reduction, a thickness of the thick portion 36 is preferably approximately 1 to 3 mm, more preferably approximately 1.5 to 2.5 mm within a range thicker than the ribs 21, 22. As shown in FIGS. 5, 10, 11, the thick portion 36 is provided astride the first wall portion 31 and the head portion 34, astride the second wall portion 32 and the head portion 34, and astride the third wall portion 33 to the head portion 34. Furthermore, the thick portion 36 is provided astride the first wall portion 31 and the third wall portion 33, and astride the third wall portion 33 and the second wall portion 32. Therefore, rigidity of the base portion 30 is high. Of course, even when the thick portion 36 is not provided on all of the wall portions 31 to 33, if the thick portion 36 is provided astride the head portion 34 and at least one of the wall portions 31 to 33, rigidity of the base portion 30 is increased.

As shown in FIG. 11, the distance L1 between the first wall portion 31 at a connection part to the head portion 34 and the second wall portion 32 at a connection part to the head portion 34 is narrower than the distance L2 between the first wall portion 31 at a connection part to the counter surface 11b and the second wall portion 32 at a connection part to the counter surface 11b. The wall portions 31, 32 shown in FIG. 11 are declined to come close to each other toward the head portion 34 and the opening OP1 is formed in an approximately trapezoidal shape. Therefore, rigidity of the base portion 30 is high.

As shown in FIGS. 5 to 7 and other figures, outer surfaces 31o, 32o, 33o, which are opposite to the internal space SP1, of the wall portions 31, 32, 33 are connected to the impact absorbing rib 20. In an example shown in the figures, the outer surface 31o of the first wall portion 31 is connected to a plurality of horizontal ribs 22, the outer surface 32o of the second wall portion 32 is connected to one of the horizontal ribs 22, and the outer surface 33o of the third wall portion 33 is connected to the vertical rib 21. Therefore, when the impact is input, the impact absorbing rib 20 is deformed by receiving the load between the base portion 30 and the contact position of the occupant. In some cases, the divided ribs 41, 42, 43 are deformed by receiving the load transmitted through the impact absorbing rib 20. Of course, even when not all of the outer surfaces 31o to 33o are connected to the impact absorbing rib 20, if at least one of the outer surfaces 31o to 33o of the wall portions 31 to 33 is connected to the impact absorbing rib 20, the impact absorbing rib 20 is deformed by receiving the load between the base portion 30 and the contact position of the occupant when the impact is input. In some cases, the divided ribs 41, 42, 43 are deformed by receiving the load transmitted through the impact absorbing rib 20.

In addition, an extended end 21e of the vertical rib 21, which is formed along the longitudinal direction DL1 of the main portion 11c of the pillar garnish 1A, is bent in a direction of approaching to the pillar panel 2A at a connection part to the outer surface 33o of the third wall portion, and is integrated with the outer surface 33o of the third wall portion. An extended end 22e of the horizontal ribs 22, which is formed approximately perpendicular to the longitudinal direction DL1 of the main portion 11c, is bent in a direction of approaching to the pillar panel 2A at a connection part to the outer surfaces 31o, 32o of the wall portions 31, 32, and is integrated with the outer surfaces 31o, 32o of the wall portions 31, 32. Since the extended ends 21e, 22e of the impact absorbing rib 20 are bent in a direction of approaching to the pillar panel 2A and connected to the outer surfaces 31o to 33o of the wall portions, the impact absorbing rib 20 is firmly fixed with the wall portions 31 to 33. Thus, the impact absorbing performance is improved.

As shown in FIGS. 5, 9, 10 and other figures, a plate-shaped reinforcing rib 35 is formed between the counter surface 11b and the head portion 34. The reinforcing rib 35 is connected to the wall portions 31, 32, 33 so as to partition the space SP1. Totally considering viewpoints such as strength, impact absorbing performance, and weight reduction, a thickness of the reinforcing rib 35 is preferably approximately 1 to 3 mm, more preferably approximately 1.5 to 2.5 mm within a range thicker than the ribs 21, 22. Since the reinforcing rib 35 is existed, the strength of the base portion 30 is further increased.

Note that, on the wall portions 31, 32, 33, thin portions 31a, 32a, 33a, which are thinner than the thick portion 36, are formed at root portions connected to the counter surface 11b. In other words, the thick portion 36 is separated from the counter surface 11b. Consequently, projections and recesses referred to as sink marks, which are formed on a cabin side surface 11a of the pillar garnish 1A caused by delayed cooling in the molding such as the injection molding, can be prevented.

As shown in FIGS. 5, 6 and other figures, the insertion portion 40, which is integrated with the head portion 34 of the base portion 30 extended from the counter surface 11b, is formed to be tapered so that a cross section perpendicular to the insertion direction D4 gradually decreases toward a tip portion 40a. Since the insertion portion 40 is tapered, the worker can easily insert the insertion portion 40 into the hole 3 of the pillar panel 2A when the worker assembles the pillar garnish 1A on the pillar panel 2A. In addition, since the insertion portion 40 is guided to an assembling position by the tapered shape, assembling workability of the worker is improved.

As shown in FIGS. 5 to 10, the insertion portion 40 has a plurality of the divided ribs 41, 42, 43 branched so as to be directed toward the edge portion 3e of the hole 3 of the pillar panel 2A. As shown in FIG. 7, "toward the edge portion 3e" means that the divided ribs 41, 42, 43 are directed from a virtual axis AX1 toward the outward direction (outward direction D6) of the virtual axis AX1. Here, the virtual axis AX1 is an axis which passes through the hole 3 along the insertion direction D4, which is a direction of inserting the insertion portion 40 into the hole 3 of the pillar panel. Since the divided ribs 41 to 43 are existed, the insertion portion 40 is easily hooked by the edge portion 3e of the hole 3 of the pillar panel when the impact is input. Consequently, the insertion portion 40 is prevented from being dropped out from the hole 3 of the pillar panel, and impact load can be received by the impact absorbing rib 20. In the example shown in the figure, the impact absorbing rib 20 connected to the wall portions 31 to 33 is deformed to absorb the impact. In some cases, the impact absorbing rib 20 is broken to absorb the impact.

The outer surfaces 41o, 42o, 43o of the divided ribs 41, 42, 43 have inclined surfaces extended toward the outward direction (outward direction D6) of the virtual axis AX1. The outer surfaces 41o, 42o, 43o are extended more as approaching from the tip portion 40a toward the head portion 34. In other words, the inclined surfaces formed on the divided ribs 41 to 43 are located so as to come close to each other toward the tip portion 40a of the insertion portion 40.

As shown in FIGS. 5, 6, the outer surfaces 41o, 42o of the divided ribs 41, 42 are extended toward the outward direction (outward direction D6) of the virtual axis AX1 at a connection part to the head portion 34. The outer surfaces 41o, 42o are extended more as approaching toward the head portion 34 so that the outer surfaces 41o, 42o are aligned with the panel side surface 34p of the head portion 34. Here, the panel side surface 34p is a surface that faces the pillar panel 2A. In other words, at least a part of the outer surfaces 41o to 43o of the divided ribs 41 to 43 is connected to the head portion 34 at the connection part to the head portion 34 while being bent or inclined. Therefore, when the impact is input, the insertion portion 40 is difficult to be broken at the connection part to the head portion 34. As a result, the impact absorbing performance is improved when the impact force F1 is applied in the crossing direction D5.

The divided ribs 41, 42, 43 are preferably thicker than the thick portion 36. A thickness of the divided ribs 41, 42, 43 is preferably approximately 2.5 to 10.0 mm, and more preferably approximately 3.0 to 5.0 mm. If the thicknesses of the divided ribs are equal to or more than the above mentioned lower limit value, the divided ribs are prevented from being broken or deformed when the impact is input. If the thicknesses of the divided ribs are equal to or less than the above mentioned upper limit value, the insertion portion 40 can be easily inserted into the hole 3.

FIGS. 9, 10 show cross-sectional views wherein the pillar garnish 1A is assembled to the pillar panel 2A by inserting the insertion portion 40 into the hole 3 of the pillar panel 2A. A symbol 70 indicates an opening trim. As shown in FIGS. 9, 10, when the pillar garnish 1A is assembled to the pillar panel 2A, the divided ribs 41 to 43 are designed not to be in contact with the edge portion 3e of the hole 3 so that the divided ribs 41 to 43 are separated from the edge portion 3e. In addition, the divided ribs 41 to 43 are arranged facing the edge portion 3e. Since the insertion portion 40 is separated from the edge portion 3e of the hole 3, the pillar garnish 1A can be easily assembled to the pillar panel 2A. A distance L3 between the insertion portion 40 and the edge portion 3e of the hole 3 when being assembled is preferably approximately 0.5 to 5.0 mm, and more preferably approximately 1.5 to 2.5 mm. If the distance L3 is equal to or more than the above mentioned lower limit value, the insertion portion 40 can be easily inserted into the hole 3 and clearance can be ensured to absorb molding variations and the like. If the distance L3 is equal to or less than the above mentioned upper limit value, rise of the load in a load-displacement curve is further improved in the impact test, and the impact absorbing performance is improved.

When assembling the pillar garnish 1A, a length (insertion amount H1) of the insertion portion 40 protruded from the hole 3 to the vehicle outside is preferably approximately 4.0 to 8.0 mm, and more preferably approximately 5.0 to 6.0 mm. If the insertion amount H1 is equal to or more than the above mentioned lower limit value, the insertion portion 40 is prevented from being dropped out from the hole 3 when the impact is input. If the insertion amount H1 is equal to or less than the above mentioned upper limit value, the pillar garnish 1A can be easily assembled to the pillar panel 2A.

Note that the hole 3 of the pillar panel 2A is formed so that the edge portion 3e is a square shape. The divided ribs 41, 42, 43 are formed so as to be directed toward one of four sides of the edge portion 3e. Thus, the insertion portion 40 can absorb the impact by being immediately engaged with the pillar panel 2A regardless of the direction of the impact force F1 input from the head of the occupant to the pillar garnish 1A. In the divided rib 43, two side walls, which are directed toward neighboring two sides of the edge portion 3e, are inclined so that the distance between the side walls and the edge portion 3e becomes narrower as approaching to the head portion 34. Therefore, the strength of the insertion portion 40 is improved compared to a case of forming the insertion portion 40 in a cross shape. In addition, the divided rib 43 is arranged at a front side, not a rear side with which the occupant is in contact when the impact is input. Therefore, there is a high possibility that the divided rib 43 is locked by being hit against the edge portion 3e of the hole 3 of the pillar panel. Since the strength of the divided rib 43 is high, the insertion portion 40 is prevented from being broken or fractured when the impact is input.

On the pillar garnish 1A, the base portion 30, which is integrated with the above explained insertion portion 40, is integrally formed with the body 11, the impact absorbing rib 20 and other portions.

Note that a shape of the insertion portion 40 is not limited to the shape of having the divided ribs 41 to 43. The shape can be a columnar shape, a cylindrical shape, a conical shape, a pyramidal shape, or a rectangular cylindrical shape, for example. A shape of the hole 3 of the vehicle body panel 2 is not limited to a square shape. The shape can be a circular shape, for example, so as to match with the shape of the insertion portion 40.

When the pillar garnish 1A is formed by injection-molding the resin molding material, an injection molding die having a slide die corresponding to the internal space SP1 of the base portion 30 can be used. For the injection molding die, a fixed die and a movable die can be used to form a cavity corresponding to the shape of the pillar garnish 1A. The molded pillar garnish 1A can be obtained by positioning the slide die, closing the injection molding die, injecting liquid resin molding material such as molten resin molding material into the cavity, solidifying or hardening the resin molding material, and then opening the injection molding die.

Figure 12:
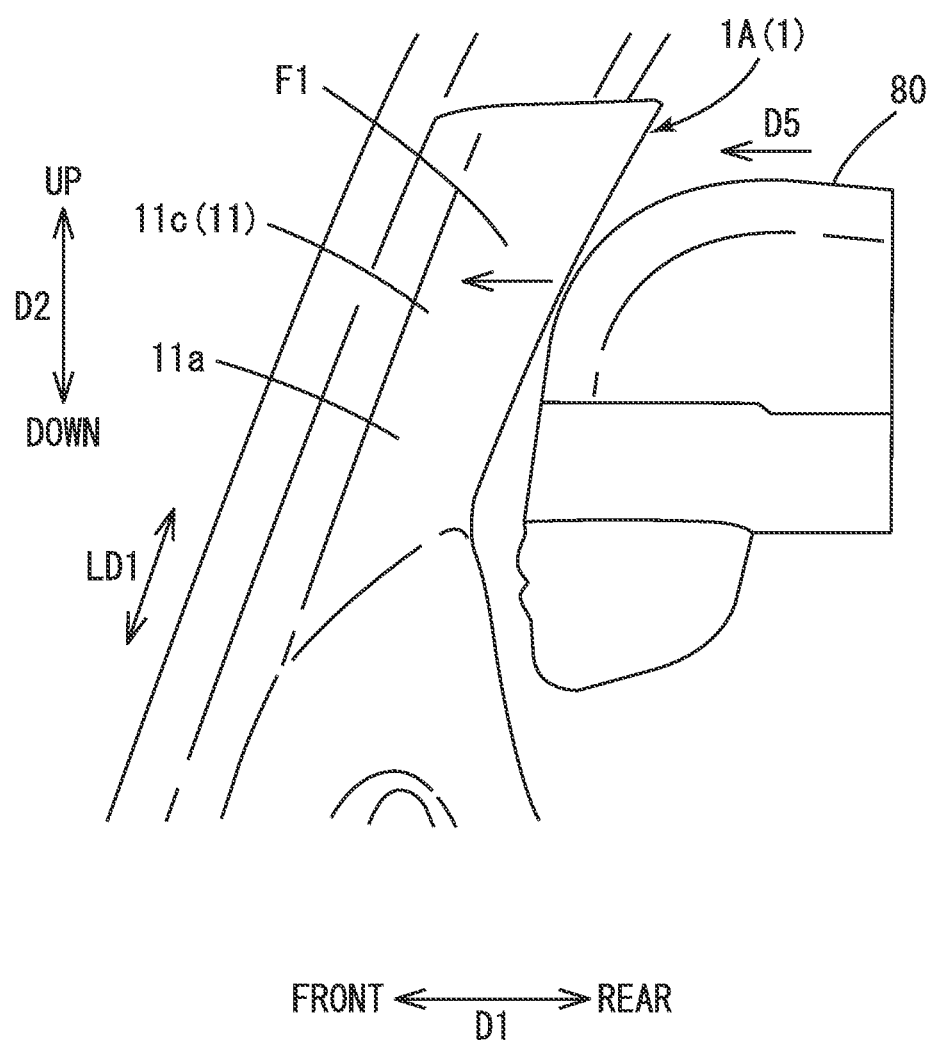
FIG. 12 is a diagram schematically showing an example of an impact test.

(3) Operation and Effects of Concrete Examples:

Since the integrally formed pillar garnish 1A has the thick portion 36 on the base portion 30 which is extended from the counter surface 11b facing the pillar panel 2A, the rigidity of the base portion 30 is increased. The insertion portion 40 to be inserted into the hole 3 of the pillar panel 2A is integrated with the head portion 34 of the base portion 30 having high rigidity. Therefore, as shown in FIGS. 8, 12, even if the impact force F1 is applied in the direction D5, which is crossing the insertion direction D4 for inserting the insertion portion 40 into the hole 3 of the pillar panel 2A, the insertion portion 40 is prevented from being disconnected from the hole 3 of the pillar panel 2A. Consequently, the present technology is capable of improving the impact absorbing performance without using the clips when the impact force F1 is applied in the direction D5, which is crossing the insertion direction D4 of the insertion portion 40.

In addition, the distance L1 between the wall portions 31, 32 at the connection part to the head portion 34 is narrower than the distance L2 between the wall portions 31, 32 at the connection part to the counter surface 11b. The third wall portion 33 and the reinforcing rib 35 are formed on the base portion 30. The thick portion 36 is provided astride the wall portions 31 to 33 and the head portion 34. By adopting the above configurations, rigidity of the base portion 30 can be further increased. In the above configurations, the insertion portion 40 is further prevented from being disconnected from the hole 3 of the pillar panel, and the impact absorbing performance can be further improved when the impact force F1 is applied in the crossing direction D5.

Furthermore, the outer surfaces 31o to 33o of the wall portions are connected to the impact absorbing rib 20. Therefore, when the impact is input, the impact absorbing rib 20 is deformed by receiving the load between the base portion 30 and the contact position of the occupant. In some cases, the insertion portion 40 is deformed by receiving the load transmitted through the impact absorbing rib 20. Consequently, the impact absorbing performance is improved when the impact force F1 is applied in the crossing direction D5. In particular, even when the impact force F1 is input in a direction different from the extending direction of the impact absorbing rib 20 by nearly 90 degrees, for example, the insertion portion 40 extended from the base portion 30 of high rigidity is locked by being hit against the edge portion 3e of the hole 3 of the pillar panel. Therefore, the pillar garnish 1A is prevented from moving and sliding on the pillar panel 2A. Consequently, the impact absorbing rib 20 is deformed by receiving the impact load. In some cases, the impact absorbing rib 20 is broken or crushed to absorb the impact load. Thus, an obstruction value to the occupant is reduced.

(4) Example of Analysis:

By using a CAE (Computer Aided Engineering), a sample of the above described embodiment and a sample of a comparative example were analyzed. In the sample of the embodiment, the pillar garnish having the base portion 30 and the insertion portion 40 was assembled to the pillar panel. In the sample of the comparative example, the pillar garnish without having the base portion 30 and the insertion portion 40 was assembled to the pillar panel. A thickness of the ribs 21, 22 was specified to be 1.0 mm, a thickness of the thick portion 36 and the reinforcing rib 35 was specified to be 2.0 mm, a thickness of the divided ribs 41 to 43 was specified to be 3.0 mm, and the insertion amount H1 of the insertion portion 40 was specified to be 5.0 mm. The analysis was performed, as shown in FIGS. 8, 12, by simulating the load applied to the FMH 80, which is a dummy imitating the head of the occupant used for the impact test, when the FMH 80 collided with the samples at a speed of 24 km/h. The obtained load-displacement curve is shown in FIG. 13.

Figure 13:
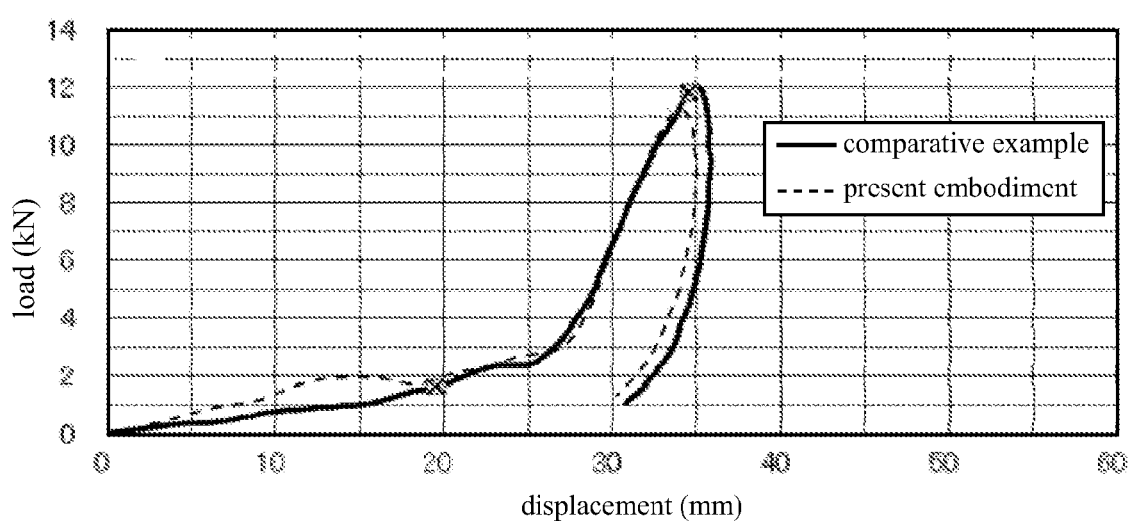
FIG. 13 is a diagram showing an example of a load-displacement curve.

As shown in FIG. 13, at the initial displacement (4 to 18 mm), the load was larger in the present embodiment than the comparative example. Thus, the sample of the embodiment has higher impact absorbing performance than the comparative example. Therefore the HIC (Head Injury Criteria) is reduced in the embodiment. In addition, a bottom load (maximum load) was smaller in the embodiment than the comparative example. Also in this point of view, the HIC is reduced in the embodiment. As explained above, it is confirmed that the interior material having the base portion 30 with which the insertion portion 40 is integrated can improve the impact absorbing performance when the impact force is applied in the direction crossing the insertion direction of the insertion portion.

(5) Variation Examples:

Various variation examples can be considered for the present invention. The present invention can be applied to the interior material other than the front pillar garnish 1A. For example, the present invention can be applied to the center pillar garnish 1B, the rear pillar garnish, the side roof rail garnish 1C, the roof trim 1D, and a door trim, for example.

The shape of the insertion portion 40 can be other than the tapered shape (e.g. cylindrical shape).

Although the wall portions 31 to 33 are preferred to be connected to the impact absorbing rib 20, a basic effect of the present invention can be obtained even if all of the wall portions 31 to 33 are separated from the impact absorbing rib 20.

Although the reinforcing rib 35 and the third wall portion 33 are preferred to be provided, a basic effect of the present invention can be obtained even if the reinforcing rib 35 and the third wall portion 33 are not provided.

Although the distance L1 between the wall portions 31, 32 at the connection part to the head portion 34 is preferably narrower than the distance L2 between the wall portions 31, 32 at the connection part to the counter surface 11b, the distance L1 can be same as the distance L2.

In addition, the shape of the base portion 30 can be other than the tower shape (e.g. tubular shape such as cylindrical shape).

Note that if the base portion 30 having the tower shape is provided on the interior material 1, the rigidity of the base portion 30 can be improved even if the thick portion 36 is not provided. Therefore, the impact absorbing performance can be improved when the impact force F1 is applied in the direction D5 crossing the insertion direction D4 of the insertion portion. Thus, the present invention has an embodiment of the integrally formed vehicle interior material having: the impact absorbing rib 20 that is extended from the counter surface 11b facing the vehicle body panel 2; the insertion portion 40 that is inserted into the hole 3 formed on the vehicle body panel 2; the head portion 34 that is integrated with the insertion portion 40 so that the space SP1 is formed between the head portion 34 and the counter surface 11b; and the first and second wall portions 31, 32 that face each other across the space SP1 and lead from the counter surface 11b to the head portion 34.

(6) Conclusion:

As explained above, according to various embodiments of the present invention, a technology capable of improving the impact absorbing performance when the impact force is applied in the direction crossing the insertion direction of the insertion portion can be provided. Of course, a technique comprised only of the independent claim without having components of the dependent claims, for example, can have the above described fundamental functions and effects.

The present invention can be also implemented by replacing the features disclosed in the above-described embodiments and variation examples with each other or changing the combinations thereof, and the present invention can be also implemented by replacing the conventional features and the features disclosed in the above-described embodiments and variation examples with each other or changing the combinations thereof. The present invention includes these features.

Although the invention has been described in considerable detail in language specific to structural features and or method acts, it is to be understood that the invention defined in the appended claims is not necessarily limited to the specific features or acts described. Rather, the specific features and acts are disclosed as preferred forms of implementing the claimed invention. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, proximal, distal, etc. have been used for convenience purposes only and are not intended to imply any particular fixed direction or orientation. Instead, they are used to reflect relative locations and/or directions/orientations between various portions of an object.

What is claimed is:

1. A vehicle interior material that is integrally formed, the vehicle interior material comprising:
    an impact absorbing rib that is extended from a counter surface facing a vehicle body panel;
    an insertion portion that is inserted into a hole formed on the vehicle body panel; and
    a base portion that has a thick portion that is thicker than the impact absorbing rib, is extended from the counter surface, and is integrated with the insertion portion at a tip portion of the base portion,
    the base portion has a head portion integrated with the insertion portion at the tip portion of the base portion; and
    the insertion portion gradually becomes thicker from a tip portion of the insertion portion toward the head portion.

2. The vehicle interior material according to claim 1, wherein
    the base portion has first and second wall portions that face each other across a space and lead from the counter surface to the head portion, and
    the thick portion is provided astride the head portion and at least one of the first and second wall portions.

3. The vehicle interior material according to claim 2, wherein
    a distance between the first wall portion at a connection part to the head portion and the second wall portion at a connection part to the head portion is narrower than a distance between the first wall portion at a connection part to the counter surface and the second wall portion at a connection part to the counter surface.

4. The vehicle interior material according to claim 2, wherein
    the head portion has:
        a first edge portion connected to the first wall portion;
        a second edge portion connected to the second wall portion; and
        third and fourth edge portions connected to both the first edge portion and the second edge portion while being separated with each other, and
    the base portion has a third wall portion that leads from the counter surface to the third edge portion.

5. The vehicle interior material according to claim 4, wherein
    the thick portion is provided astride the third wall portion and at least one of the first and second wall portions.

6. The vehicle interior material according to claim 4, wherein at least one of the first wall portion, the second wall portion, and the third wall portion has a root portion connected to the counter surface; and the root portion has a thin portion that is thinner than the thick portion.

7. The vehicle interior material according to claim 2, wherein at least one of outer surfaces of the first wall portion and the second wall portion is connected to the impact absorbing rib.

8. The vehicle interior material according to claim 2, wherein the head portion has a panel side surface facing the vehicle body panel; and outer surfaces of the insertion portion are extended outward from a virtual axis that is along an insertion direction toward the hole of the vehicle body panel at a connection part to the head portion so that the outer surfaces are aligned with the panel side surface of the head portion.

9. The vehicle interior material according to claim 1, wherein the insertion portion has a plurality of divided ribs that are branched so as to be directed toward an edge portion of the hole of the vehicle body panel.

10. The vehicle interior material according to claim 9, wherein the divided ribs are thicker than the thick portion.

11. The vehicle interior material according to claim 1, wherein the insertion portion is arranged separated from the edge portion of the hole of the vehicle body panel when the insertion portion is mounted on the vehicle body panel.

\* \* \* \* \*